(12) United States Patent
Fauconnet et al.

(10) Patent No.: US 11,453,574 B2
(45) Date of Patent: Sep. 27, 2022

(54) ELEVATOR CARS WITH CAMERA MOUNT

(71) Applicant: Otis Elevator Company, Farmington, CT (US)

(72) Inventors: Aurelien Fauconnet, Isdes (FR); Guillaume Montigny, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/952,324

(22) Filed: Nov. 19, 2020

(65) Prior Publication Data

US 2021/0229957 A1 Jul. 29, 2021

(30) Foreign Application Priority Data

Jan. 24, 2020 (EP) .................................... 20305058

(51) Int. Cl.
*B66B 13/22* (2006.01)
*B66B 9/00* (2006.01)
*B66B 13/30* (2006.01)
*B66B 19/00* (2006.01)
*H04N 5/225* (2006.01)
*H04N 7/18* (2006.01)

(52) U.S. Cl.
CPC ............. *B66B 13/22* (2013.01); *B66B 9/00* (2013.01); *B66B 13/30* (2013.01); *B66B 19/007* (2013.01); *H04N 5/2253* (2013.01); *H04N 7/18* (2013.01)

(58) Field of Classification Search
CPC ....... B66B 13/22; B66B 19/007; B66B 13/30; H04N 5/2253; F16M 13/02
See application file for complete search history.

(56) References Cited

U.S. PATENT DOCUMENTS 7,165,655 B2 * 1/2007 Cook ..................... B66B 13/26
187/247

FOREIGN PATENT DOCUMENTS

| CN | 209084352 U | * | 7/2019 |
| CN | 212903063 U | * | 4/2021 |
| EP | 3401262 A1 | * | 11/2018 |
| EP | 3599204 A1 | * | 1/2020 |
| EP | 3599207 A1 | | 1/2020 |
| JP | 2010260648 A | | 11/2010 |
| JP | 2014076871 A | | 5/2014 |
| JP | 2018104142 A | | 7/2018 |
| JP | 6748252 B1 | * | 8/2020 |
| WO | WO-2005062734 A2 | * | 7/2005 |
| WO | WO-2019002011 A1 | * | 1/2019 |

OTHER PUBLICATIONS

European Search Report for application EP 20305058, dated Aug. 5, 2020, 100 pages.

* cited by examiner

*Primary Examiner* — Diem M Tran
(74) *Attorney, Agent, or Firm* — Cantor Colburn LLP (57) ABSTRACT

An elevator car (42; 103) for carrying a load in a vertical direction. The elevator car includes at least one elevator car door (38) carrying a door coupling (20) and a camera mount (40) comprising a mounting location (46) for a camera (44). The camera mount (40) is located at the top of the elevator car (42) with the mounting location (46) positioned for a camera (44) to monitor the door coupling (20). The camera mount is deformable at least in the vertical direction, when acted on by a downwards force, such as to protect the door coupling (20) from being impacted by the camera mount (40).

12 Claims, 7 Drawing Sheets

ELEVATOR CARS WITH CAMERA MOUNT

FOREIGN PRIORITY

This application claims priority to European Patent Application No. 20305058.8, filed Jan. 24, 2020, and all the benefits accruing therefrom under 35 U.S.C. § 119, the contents of which in its entirety are herein incorporated by reference.

TECHNICAL FIELD

This disclosure relates to an elevator system and an elevator car comprising a camera mount and a method for mounting a camera on an elevator car within an elevator system.

BACKGROUND

Known elevator systems include a door coupling, on the elevator car doors, which couples to a set of landing doors when the elevator car is stopped at a landing floor. This door coupling connects the two sets of doors so that as the elevator car doors open, so too do the landing doors. It is advisable that this door coupling be checked regularly. It is known in the art for a maintenance person to carry out a regular visual inspection of this door coupling area, to check for any safety issues. It is currently known for a maintenance person to access this area from the roof of an elevator car, which requires the elevator system to have an overhead space which is sufficiently large to accommodate the maintenance person.

There is a minimum overhead requirement, specified by the relevant safety code, for any elevator system. That overhead space is specified for the "car jump" position. That is, the overhead space in any elevator system must be sufficiently large that in the "car jump" position, in which the elevator counterweight contacts the buffer at the bottom of the hoistway, the top of the elevator car will not touch the ceiling of the hoistway. Generally, in order to provide this minimum overhead space, tall components cannot be mounted to the top of an elevator car, which extend into this required overhead space, since in the "car jump" position, they would contact the ceiling.

It is desirable to be able to remotely inspect the door coupling of an elevator car door, however, this may require additional hardware to be mounted on the elevator car. It is also desirable to minimise the overhead space in an elevator system.

SUMMARY

According to a first aspect of this disclosure there is provided an elevator car for carrying a load in a vertical direction, comprising: at least one elevator car door carrying a door coupling; a camera mount comprising a mounting location for a camera; wherein the camera mount is located at the top of the elevator car with the mounting location positioned for a camera to monitor the door coupling and is deformable at least in the vertical direction, when acted on by a downwards force, such as to protect the door coupling from being impacted by the camera mount.

According to a second aspect of this disclosure there is provided an elevator system, comprising: a hoistway; a ceiling at the top of the hoistway; an elevator counterweight; and an elevator car as disclosed herein, wherein, in use, when the counterweight is at its lowest position in the hoistway, the camera mount is arranged to contact the ceiling, and deform in the vertical direction, towards the top of the elevator car.

According to a third aspect of this disclosure there is provided a method of modifying an elevator car to add a monitoring function for a car door coupling, the method comprising: installing a camera mount for a camera at the top of the elevator car, wherein the camera mount is deformable in the vertical direction, when acted on by a downwards force.

Thus, according to the present disclosure, there is provided a camera mount which allows a camera to be mounted in a position in which it monitors the door coupling, thereby reducing the need for manual visual inspection by a maintenance person. Moreover, the camera mount is arranged to deform in the event of a downwards force, so that if the camera mount is contacted from above i.e. when the car jumps, it deforms such that damage to the door coupling is prevented. This provides a safety function in the event of a car jump bringing the camera mount into contact with the ceiling or a maintenance person on top of the car standing on the camera mount. Since the camera mount is able to deform downwards in the vertical direction in the event of contact, it is allowed, in the non-deformed position, to extend into the overhead space allowance of the elevator system. This helps the elevator system and any elevator car designed for use therein to meet with safety regulations, whilst also reducing the required overhead space despite the presence of the camera mount.

In some examples, the elevator car further comprises a camera mounted on the mounting location and arranged to monitor the car door coupling. Thus, in some examples, the method according to the present disclosure further comprises mounting a camera on the camera mount, for example at a mounting location.

In some examples, additionally or alternatively, the elevator car further comprises a car door lintel above the at least one elevator car door, and the camera mount is positioned on the car door lintel. The car door lintel provides a particularly convenient location at which to position the camera mount, and from which a simple camera (e.g. standard resolution) is able to satisfactorily monitor the door coupling.

It may be that the camera mount is plastically deformable, such that once moved downwards it does not return to its original position. For example, the camera mount may be configured to snap or crumple. This still provides the advantages of the camera mount accommodating a car jump while protecting the door coupling from damage. However, in other examples, the camera mount is elastically deformable. This helps to provide a camera mount which will return to its original position after deformation, such that the camera mount will be usable after an impact and its mounting location will be in the same position as before the contact, so that a camera mounted on the mounting location continues to provide a field of view showing the same region. This therefore helps to improve the lifetime of the camera mount and potentially any camera mounted thereon.

The elastically deformable camera mount may be made from any elastic material structure. In some examples, the camera mount is made of rubber, plastic or spring steel, or any combination thereof. In alternative examples, the camera mount is made of any other suitable material allowing elastic deformation as described herein. A camera mount made of spring steel may be particularly well suited for fastening at the top of an elevator car, for example on the car door lintel as disclosed above.

In some examples, additionally or alternatively, the camera mount comprises a single integral piece. This provides a particularly simple construction of the camera mount, which is less liable to faults, since there are no connections between separate parts, which are at a greater risk of faults.

In some examples, additionally or alternatively, the camera mount is arranged to deform in a direction substantially away from, or parallel to, the at least one elevator car door. This ensures that deformation of the camera mount does not tend to bring the mounting location (and any camera mounted thereon) closer to the door coupling. In some examples, in addition or alternatively, the camera mount is deformable in both a vertical direction and a horizontal direction, wherein the deformation in the horizontal direction is away from the door coupling.

In some examples, additionally or alternatively, the camera mount is deformable through a vertical distance of at least 1 cm, further optionally at least 2 cm, and further optionally at least 5 cm. This allows the camera mount to deform sufficiently far, in the event of a car jump, to accommodate contact with the ceiling of the hoistway.

In some examples, additionally or alternatively, the camera mount comprises a planar member. The planar member may be bent to form an angled profile. Optionally, the planar member comprises a first bend, about which the camera mount bends and pivots when acted on by a downwards force. This helps to provide a simple camera mount construction, which will deform as required, by bending around the pivot point. In at least some examples, the first bend is about 90 degrees. In some examples, additionally or alternatively, the planar member comprises a second bend, wherein the second bend is arranged to set the angle of the field of view of available from the mounting location for a camera. This helps to provide a simple construction whilst also allowing a field of view to be selected by choice of the angle of the second bend. For example, the planar member may extend from the second bend to define the mounting location at a desired angle to the vertical direction. In these or other examples, the mounting location may be at an angle of 20 to 70 degrees from the vertical direction, optionally 30-50 degrees from the vertical direction.

In some examples, additionally or alternatively, the planar member comprises a contact portion, arranged, in use, to contact an object above the elevator car. In at least some examples, the planar member comprises a third bend and the contact portion extends from the third bend towards an upper end of the camera mount. The third bend may comprise an angle of about 90 degrees. The mounting location may be arranged between the second bend and the third bend. In at least some examples the contact portion extends above the mounting location, i.e. vertically higher than the mounting location. In addition, or alternatively, the contact portion is angled away from the at least one elevator car door, so as to convert a vertical downwards force on the contact portion into a force acting on the camera mount in a direction away from the at least one elevator car door. This means that the camera mount will tend to deflect away from the at least one elevator car door in the event of a car jump.

In other examples, the camera mount may not comprise a planar member. In some examples, additionally or alternatively, the camera mount comprises a contact portion, arranged vertically higher than the mounting location. This helps to protect the mounting location in the event of a contact causing a vertically downwards force, since the contact portion will be contacted first before the mounting location (or camera, if one is mounted). The contact portion may be angled away from the at least one elevator car door, so as to convert a vertical downwards force on the contact portion into a force acting on the camera mount in a direction away from the at least one elevator car door.

DETAILED DESCRIPTION

Certain preferred examples of this disclosure will now be described, by way of example only, and with reference to the accompanying drawings, in which.

DETAILED DESCRIPTION

Figure 1:
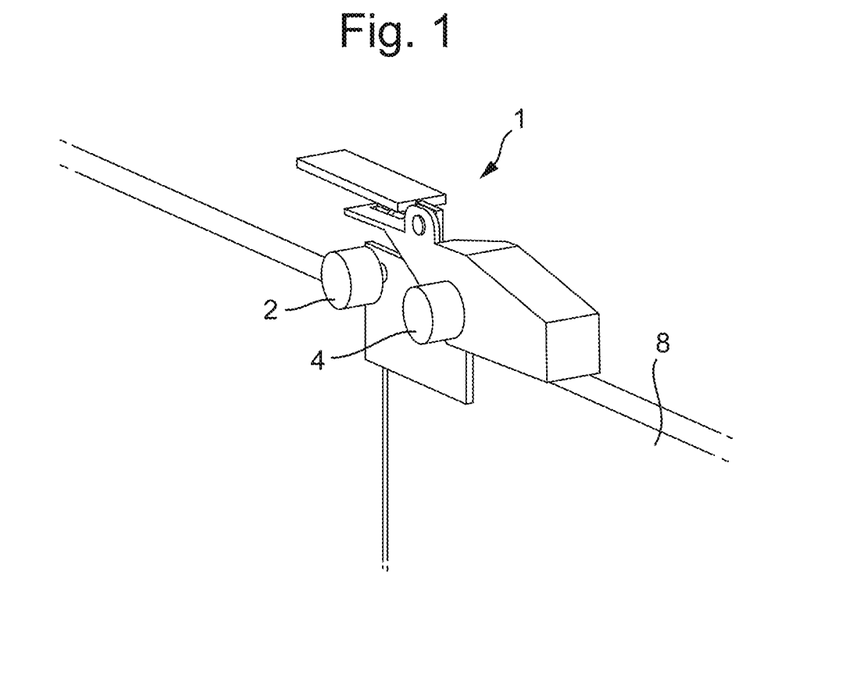
FIG. 1 is a side perspective view of a landing door lock, as is known in the art.
Figure 2:
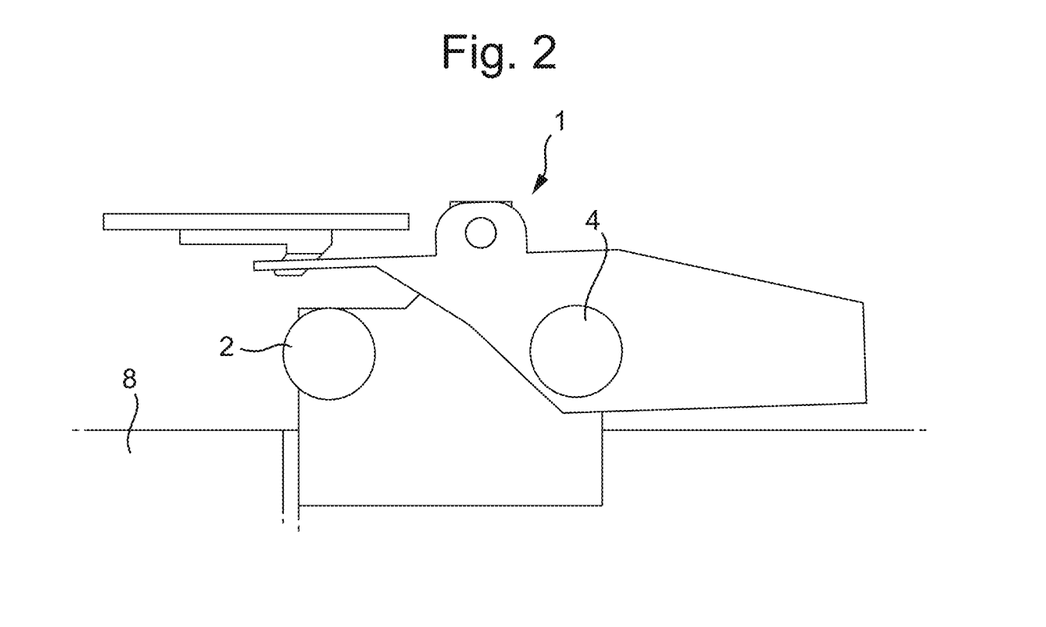
FIG. 2 is a front view of the landing door lock of FIG. 1.

FIG. 1 is a perspective view of a landing door lock 1, as is known in the art. The landing door lock 1 includes a first roller 2, and a second roller 4, and is located on a set of landing doors 8. FIG. 2 shows a front view of the landing door lock 1.

Figure 3:
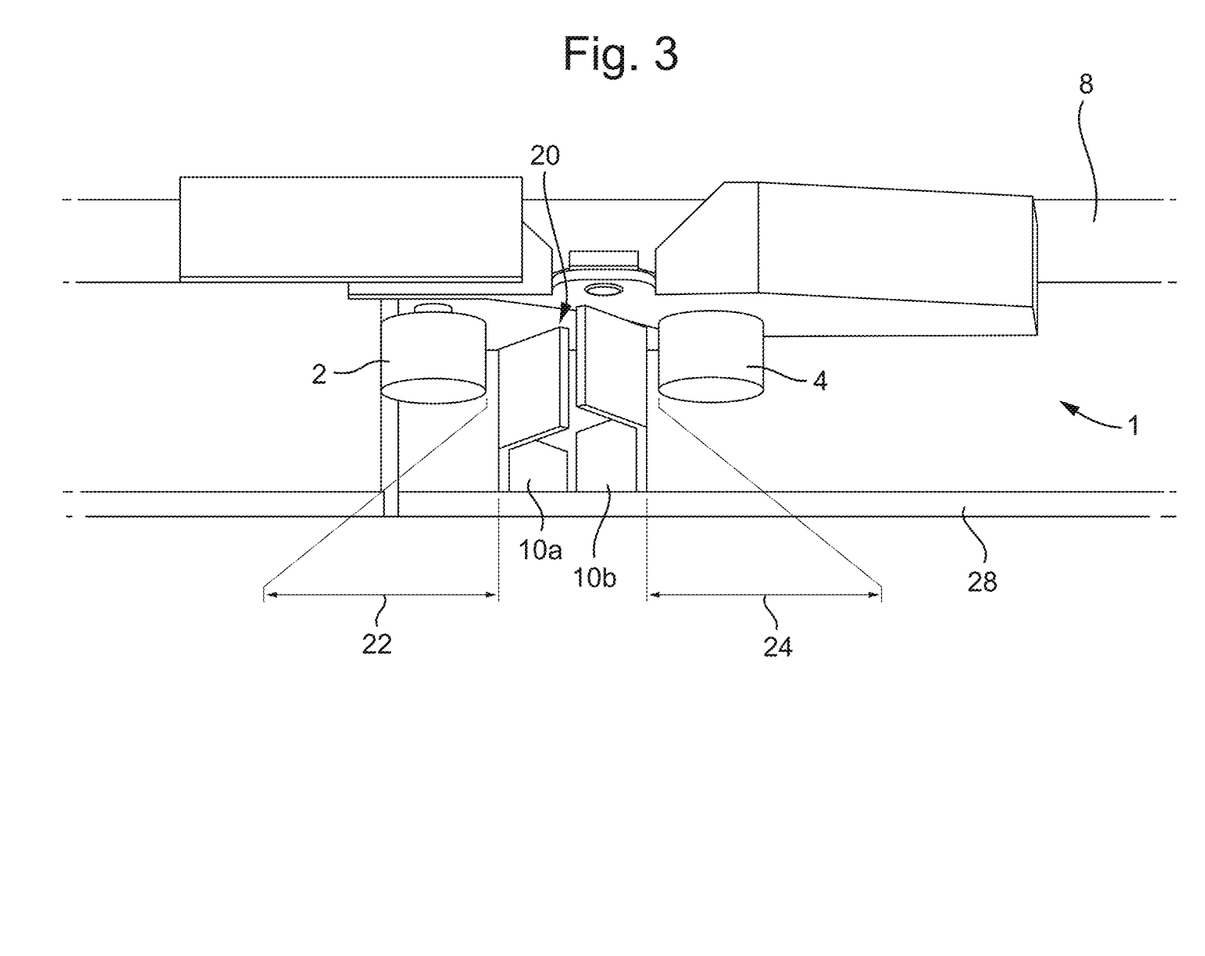
FIG. 3 is a perspective view of the landing door lock of FIGS. 1 and 2, engaging with a door coupling, as is known in the art.

FIG. 3 shows a perspective view, from above, of a car door coupling 20 of at least one elevator car door 28 engaging with a landing door lock 1, as is known in the art. In use the landing door lock 1 engages with the car door coupling 20 in order to couple the doors 8, 28 together such that as the elevator car doors 28 open, so too do the landing doors 8. In this example the car door coupling 20 comprises a pair of blades 10a, 10b, the first blade 10a arranged to engage with the first roller 2 and the second blade 10b arranged to engage with the second roller 4. It is desirable for safety reasons to monitor the clearance distances 22, 24, between respective blades 10a, 10b of the car door coupling 20, and the adjacent first and second rollers 2, 4, in order to check that there is sufficient engagement for successful operation of the door coupling system. It is known in the art for regular visual inspections to be carried out in order to check these clearance distances 22, 24 of the car door coupling 20.

Figure 4:
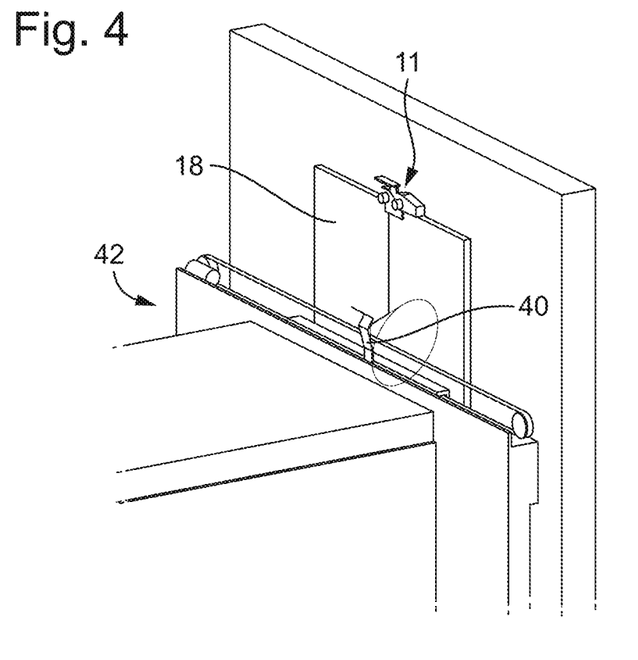
FIG. 4 is a perspective view of an elevator car according to an example of the present disclosure.

It would be desirable to be able to monitor these clearance distances 22, 24 remotely in order to ensure that these clearance distances 22, 24 stay within acceptable limits, and without the need for visual inspection by a maintenance person. For this purpose, according to the present disclosure, there is provided a camera mount 40 at the top of an elevator car 42, as seen in FIG. 4. FIG. 4 shows a perspective view of an elevator car 42 which is positioned vertically between adjacent landing floors of an elevator system, and therefore, as shown, does not align with a set of landing doors 18. A landing door lock 11 can be seen above the landing doors 18. The landing door lock 11 operates in the same way as the landing door lock 1 described above, and will therefore not be described in further detail.

Figure 5:
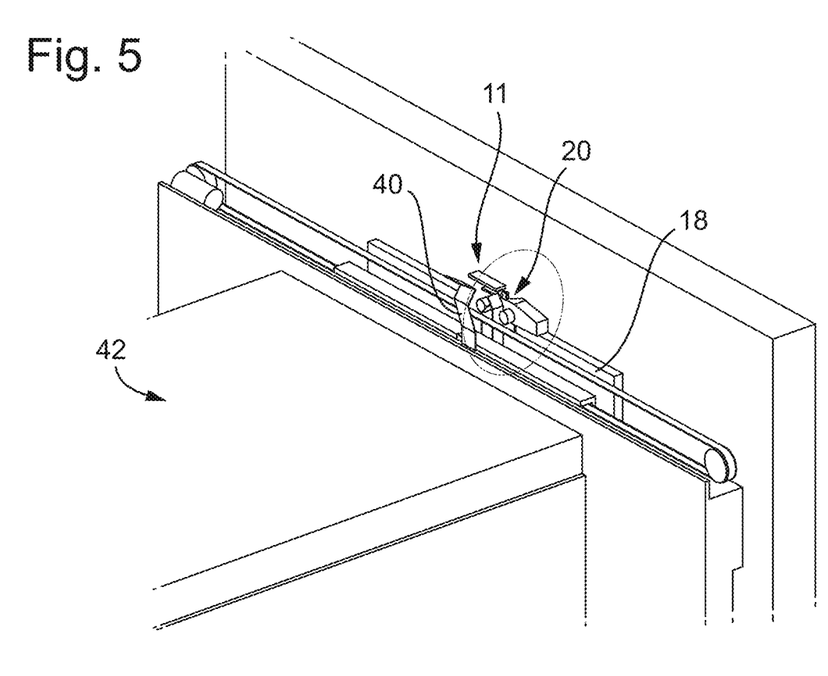
FIG. 5 is a perspective view of the elevator car of FIG. 4, positioned at a landing floor.

FIG. 5 shows a perspective view of the elevator car 42 of FIG. 4, now located at a landing floor of the elevator system and therefore adjacent to the set of landing doors 18. A car door coupling 20 of the elevator car 42 is coupled to the landing door lock 11 in this position. It is seen in these Figures that the camera mount 40 according to the present disclosure is positioned so that, when the elevator car 42 arrives at a landing floor, and the door coupling 20 engages with the landing door lock 11, a camera mounted on the camera mount 40 has a field of view of the door coupling 20 and the landing door lock 11, to allow monitoring of these components and the clearance distances 22, 24 discussed above. Even when the elevator car 42 is not positioned at a landing, a camera on the camera mount 40 can monitor the door coupling 20 and provide information about the state of the door coupling 20, for example if one of its blades 10s, 10b were to be damaged.

Figure 6:
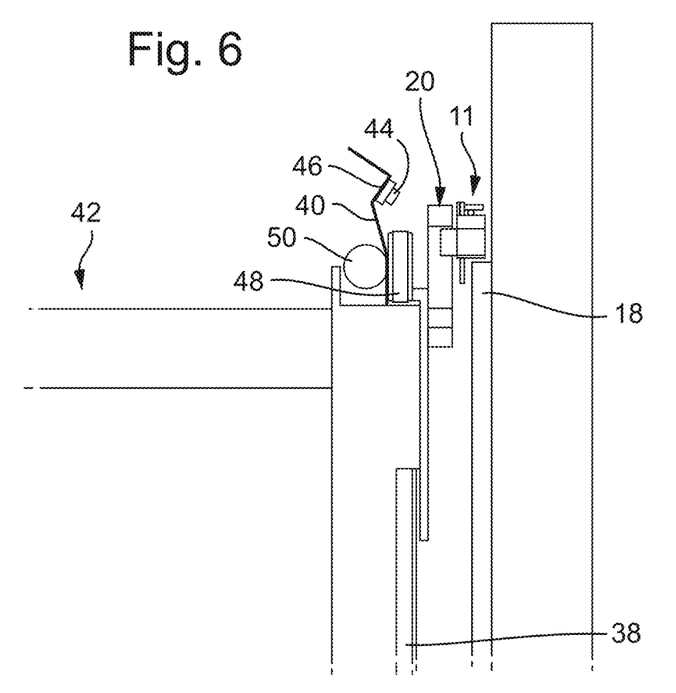
FIG. 6 is a side view of a camera mount on an elevator car according to an example of the present disclosure.
Figure 7:
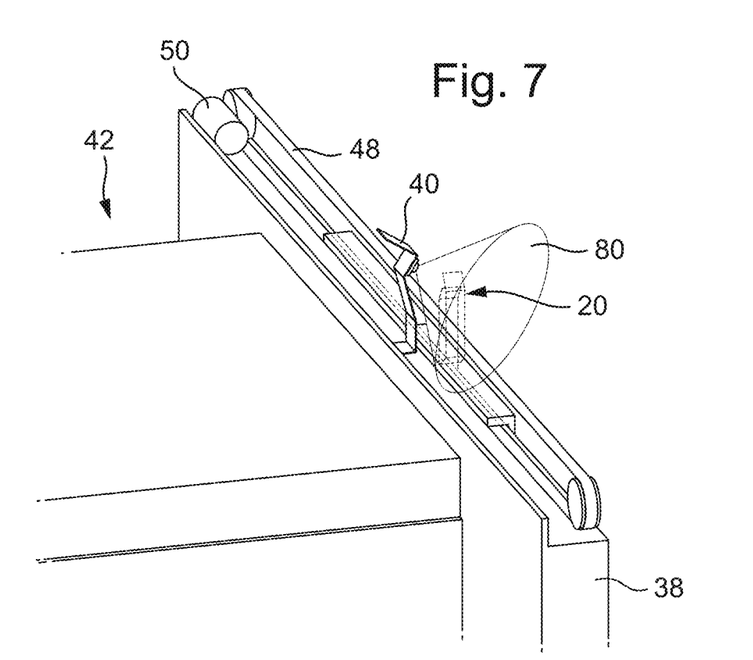
FIG. 7 is a perspective view of the camera mount of FIG. 6.

The camera mount 40 can be seen more clearly in FIG. 6, which shows a side view of the elevator car 42 according to this example of the present disclosure. In this Figure a camera 44 is shown mounted to the camera mount 40, at a mounting location 46. The mounting location 46 is positioned such that when the camera 44 is mounted in that position, the camera 44 has a field of view which clearly shows the car door coupling 20, as illustrated by FIG. 7. This allows the car door coupling 20, and its engagement with a landing door lock 11, to be monitored visually by the camera 44, to ensure certain parameters (e.g. those shown in FIGS. 2 and 3) are within allowed ranges. In this example the camera mount 40 is a planar member, e.g. made of spring steel, that is bent to form an angled profile. The camera mount 40 is formed as a single integral piece of material. The elevator car 42 comprises at least one elevator car door 38. Also shown in these Figures are a belt 48 and a motor 50 which are arranged to drive the at least one elevator car door 38.

Figure 8:
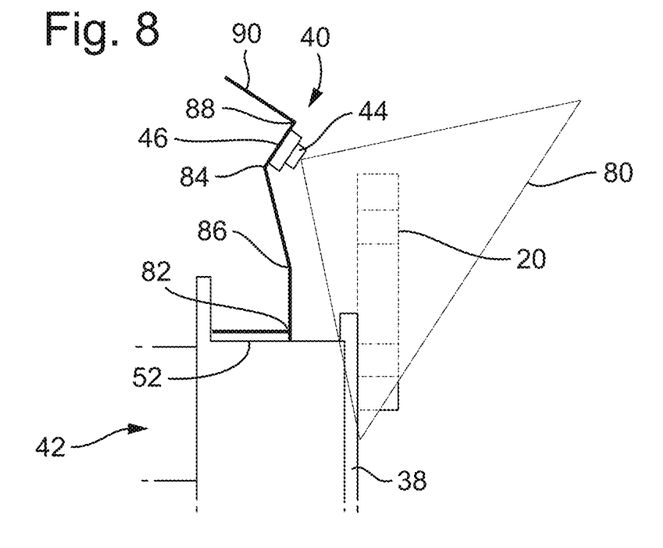
FIG. 8 is a side view of a camera mount according to an example of the present disclosure.

The camera mount 40 is shown more clearly in the side view of FIG. 8. The camera mount 40 is located in particular on a door lintel 52 of the elevator car 42. The motor and belt are omitted for clarity. It is seen that the car door coupling 20 is within the field of view 80 of the camera 44. In this particular example, the camera mount 40 is a planar member i.e. very flat and thin. The camera mount 40 comprises a first bend 82, a second bend 84, a third bend 86 and a fourth bend 88. The planar member of the camera mount 40 is therefore bent to form an angled profile. Of course any number and configuration of bends may be used to give different angled profiles.

In this example the camera mount 40 is arranged to bend and pivot about the first bend 82 (and optionally the third bend 86) when acted on by a downwards force. The second bend 84 is arranged to set the angle of the field of view 80 of the camera 44 by choice of the angle of the second bend. The mounting location 46 extends from the second bend 84 at an angle of about 30° from the vertical direction. The camera mount 40 also comprises a contact portion 90, arranged, in use, to contact an object above the elevator car 42, and angled away from the at least one elevator car door 38, so as to convert a vertical downwards force on the contact portion 90 into a force acting on the camera mount 40 in a direction away from the at least one elevator car door 38. In this example, the position of the contact portion 90 is set by a fourth bend 88 in the planar member, which angles the contact portion 90 away from the elevator car doors 38. The contact portion 90 is positioned vertically higher than the mounting location 46. This helps to protect the camera 44 in the event of a contact causing a vertically downwards force, since the contact portion 90 will be contacted first before the mounting location 46 (or camera 44, if one is mounted thereto).

Figure 9:
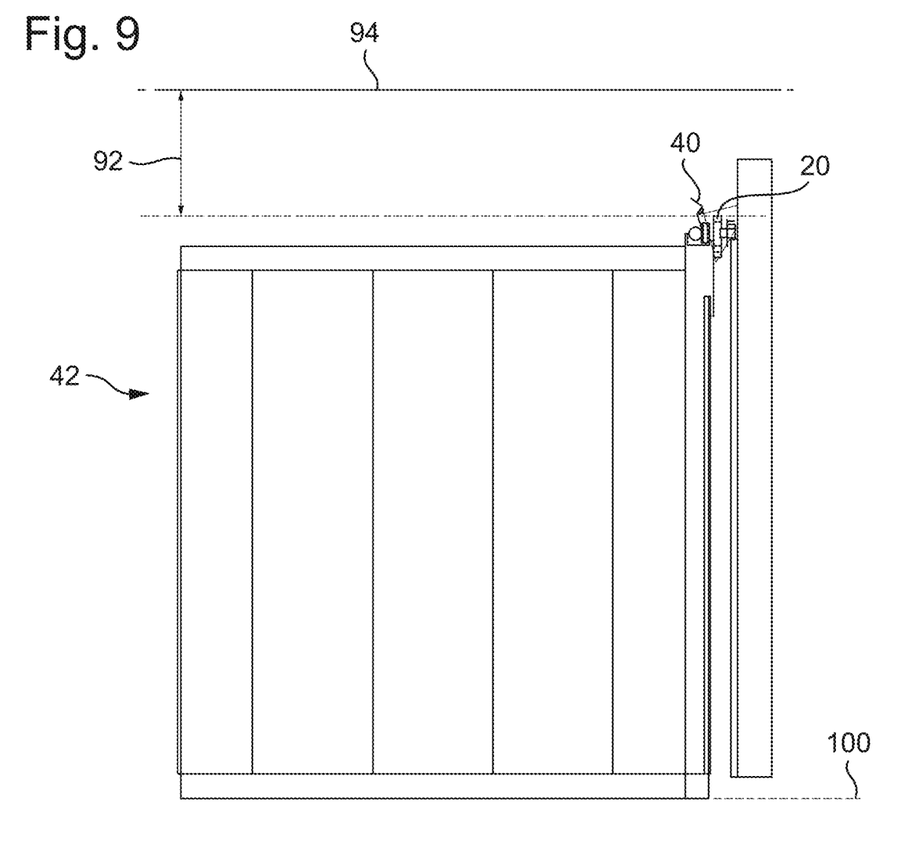
FIG. 9 is a side view of an elevator car according to an example of the present disclosure, located at the uppermost landing floor.
Figure 10:
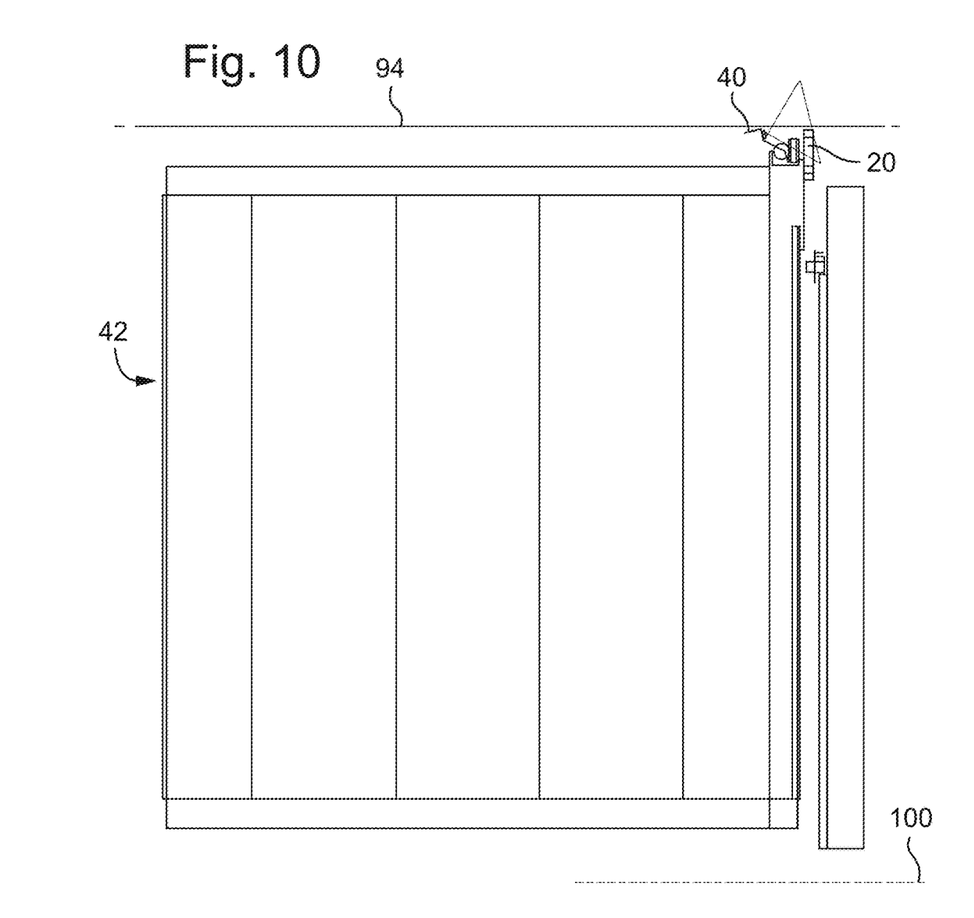
FIG. 10 is a side view of an elevator car according to an example of the present disclosure, located at the uppermost "car jump" position.

FIG. 9 is a side view showing an elevator car 42 according to an example of the present disclosure. In this Figure, the base of the elevator car 42 is located at the level of the highest landing floor 100. This is the highest position of the elevator car 42 during normal operation of the elevator system. In this position, there is an overhead clearance 92 between the top of the elevator car 42 (where the door coupling 20 is located), and the hoistway ceiling 94. This overhead clearance 92 is to ensure safety in the case of exceptional circumstances, particularly in the case of a "car jump" in which the counterweight impacts the buffer at the bottom of the hoistway, such that the elevator car moves beyond the uppermost normal operating position, to an uppermost possible position in the hoistway. This "car jump" position is seen in the side view of FIG. 10. In this position the elevator car 42 has moved up beyond the uppermost landing 100 and the overhead clearance 92 is such that the door coupling 20 does not impact the ceiling 94 of the hoistway 94. Since, as shown in FIG. 8, the camera mount 40 extends above the door coupling 20, into the overhead clearance 92, the camera mount 40 contacts the ceiling 94 when the elevator car 42 is in this uppermost "car jump" position.

Figure 11:
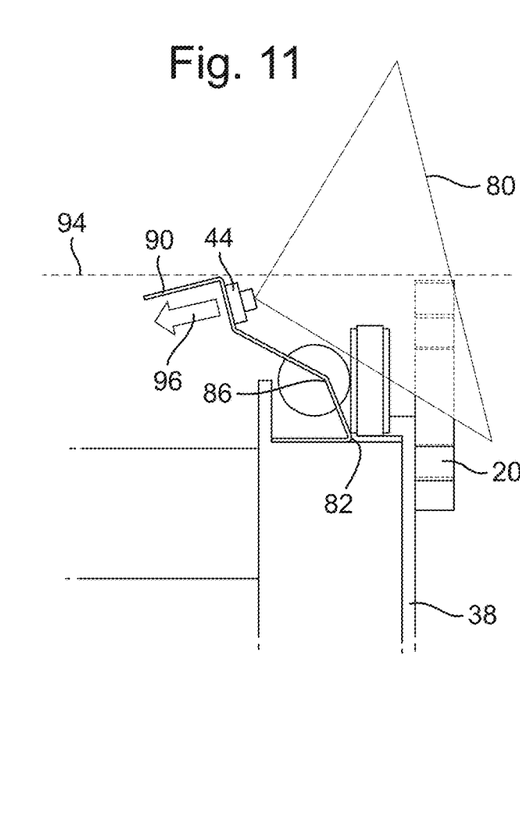
FIG. 11 is a side view showing the position of a camera mount according to an example of the present disclosure when the elevator car is in the position as shown in FIG. 10.

FIG. 11 shows a side view of the camera mount 40 when the elevator car 42 is in the "car jump position". As the elevator car 42 moves upwards, close to the ceiling 94, the contact portion 90 of the camera mount 40 contacts ceiling 94. The camera mount 40 is deformable, ideally elastically deformable, so that as the ceiling 94 applies a downward force to the camera mount 40 via the contact portion 90, the camera mount 40 deforms vertically downwards. This deformation ensures that the camera mount 40 can safely extend into the overhead clearance 92, during normal operation of the elevator system, as it will deform in the event of contact with the ceiling 94. The contact portion 90 is in particular shaped to convert a vertically downwards force, applied by the ceiling 94 of the hoistway, into a force 96 which is angled to move both downwards, and away from the elevator door(s) 38. This ensures that during deformation the camera mount 40 does not deform towards the car door coupling 20, which could risk damaging the car door coupling 20. In various examples the camera mount 40 is elastically deformable, e.g. a planar member made of spring steel, so that the camera mount 40 returns to its original position (FIG. 9) after a car jump event.

Figure 12:
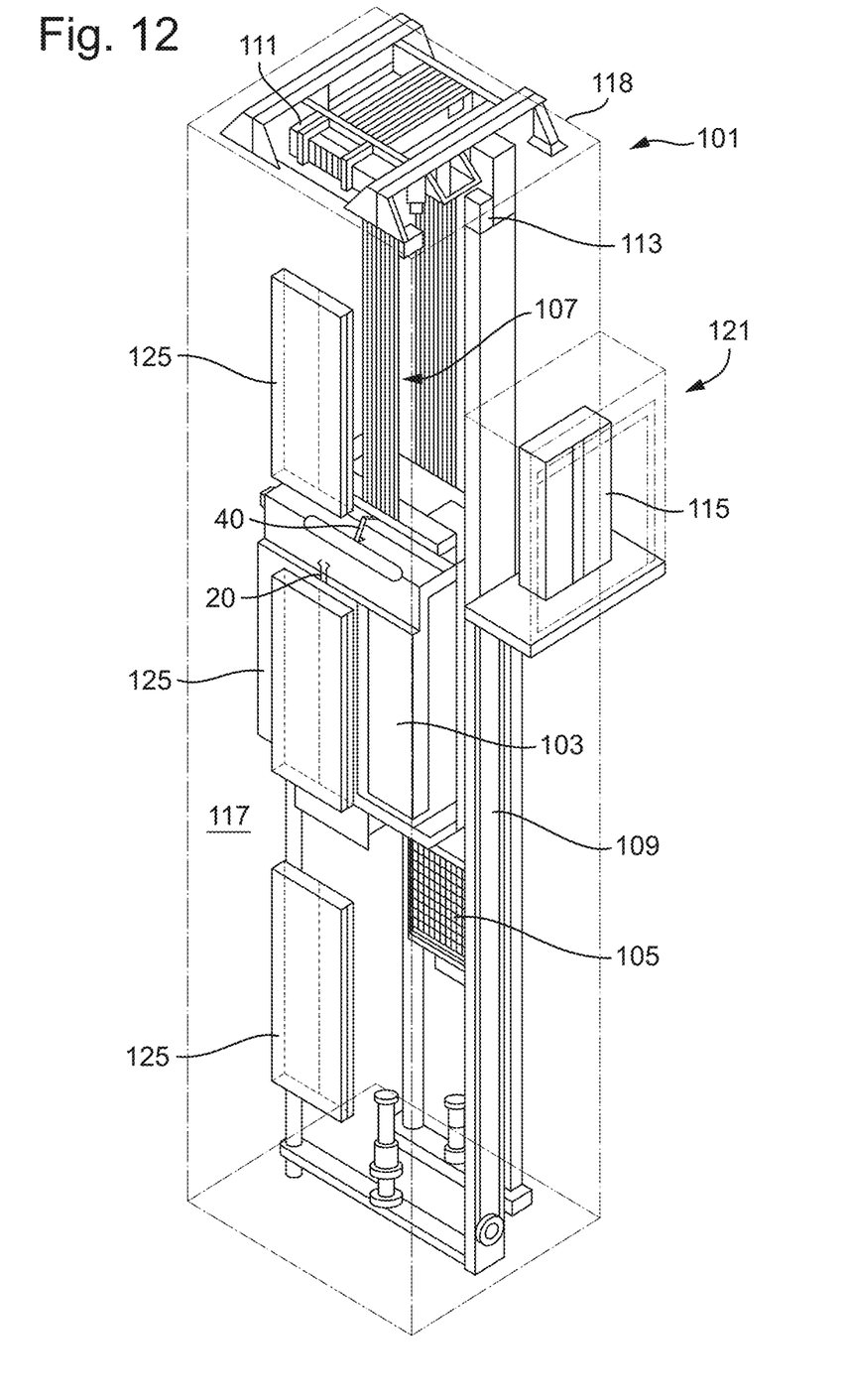
FIG. 12 is a schematic illustration of an elevator system according to an example of the present disclosure.

FIG. 12 is a perspective view of an elevator system 101 including a hoistway 117 having a ceiling 118 at the top of the hoistway 117. An elevator car 103 and counterweight 105 move in a vertical direction along the hoistway 117. There is seen an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more sets of landing doors 125 as controlled by the controller 115. Although shown in a controller room 121, those of skill in the art will appreciate that the controller 115 can be located and/or configured in other locations or positions within the elevator system 101.

As seen in FIG. 12, the camera mount 40 is located at the top of the elevator car 103. As described above, the camera mount 40 is arranged so that the door coupling 20 is within the field of view of a camera mounted on the camera mount 40. When the elevator car 103 stops at one of the landings 125, the door coupling 20 engages with a landing door lock (not shown) and a camera on the camera mount 40 can be used to remotely monitor clearance distances therebetween.

It will be appreciated by those skilled in the art that the disclosure has been illustrated by describing one or more specific examples thereof, but is not limited to these aspects; many variations and modifications are possible, within the scope of the accompanying claims.

What is claimed is:

1. An elevator car (42; 103) for carrying a load in a vertical direction, comprising:
   at least one elevator car door (38) carrying a door coupling (20);
   a camera mount (40) comprising a mounting location (46) for a camera (44);
   wherein the camera mount (40) is located at the top of the elevator car (42) with the mounting location (46) positioned for the camera (44) to monitor the door coupling 20) and is deformable at least in the vertical direction, when acted on by a downwards force, such as to protect the door coupling (20) from being impacted by the camera mount (40);
   wherein the camera mount (40) comprises a planar member and a contact portion (90), arranged vertically higher than the mounting location (46).

2. The elevator car (42) of claim 1, further comprising the camera (44) mounted on the mounting location (46) and arranged to monitor the door coupling (20).

3. The elevator car (42) of claim 1, wherein the elevator car (42) further comprises a car door lintel (52) above the at least one elevator car door (38), and wherein the camera mount (40) is positioned on the car door lintel (52).

4. The elevator car (42) of claim 1, wherein the camera mount (40) is elastically deformable.

5. The elevator car (42) of claim 1, wherein the camera mount (40) is deformable in both a vertical direction and a horizontal direction, wherein the deformation in the horizontal direction is away from the door coupling (20).

6. The elevator car (42) of claim 1, wherein the camera mount (40) is made of rubber, plastic or spring steel, or any combination thereof.

7. The elevator car (42) of claim 1, wherein the camera mount (40) comprises a single integral piece.

8. The elevator car (42) of claim 1, wherein the camera mount (40) is deformable through a vertical distance of at least 5 cm.

9. The elevator car (42) of claim 1, wherein the camera mount (40) comprises a planar member, comprising a first bend (82), about which the camera mount (40) bends and pivots when acted on by a downwards force.

10. An elevator system, comprising:
    a hoistway (117);
    a ceiling (94; 118) at a top of the hoistway (117);
    an elevator counterweight (105); and
    an elevator car (42; 103) according to claim 1, wherein, in use, when the counterweight (105) is at its lowest position in the hoistway (117), the camera mount (40) is arranged to contact the ceiling (94; 118), and deform in the vertical direction, towards the top of the elevator car (42; 103).

11. An elevator car (42; 103) for carrying a load in a vertical direction, comprising:
    at least one elevator car door (38) carrying a door coupling (20);
    a camera mount (40) comprising a mounting location (46) for a camera (44);
    wherein the camera mount (40) is located at the top of the elevator car (42) with the mounting location (46) positioned for the camera (44) to monitor the door coupling 20) and is deformable at least in the vertical direction, when acted on by a downwards force, such as to protect the door coupling (20) from being impacted by the camera mount (40);
    wherein the camera mount (40) comprises a planar member, comprising a first bend (82), about which the camera mount (40) bends and pivots when acted on by a downwards force;
    wherein the planar member comprises a second bend (84), wherein the second bend (84) is arranged to set the angle of the field of view available from the mounting location (46).

12. An elevator car (42; 103) for carrying a load in a vertical direction, comprising:
    at least one elevator car door (38) carrying a door coupling (20);
    a camera mount (40) comprising a mounting location (46) for a camera (44);
    wherein the camera mount (40) is located at the top of the elevator car (42) with the mounting location (46) positioned for the camera (44) to monitor the door coupling 20) and is deformable at least in the vertical direction, when acted on by a downwards force, such as to protect the door coupling (20) from being impacted by the camera mount (40);

wherein the camera mount (40) comprises a planar member, comprising a first bend (82), about which the camera mount (40) bends and pivots when acted on by a downwards force;

wherein the planar member comprises a contact portion (90), arranged, in use, to contact an object above the elevator car (42), and angled away from the at least one elevator car door (38), so as to convert a vertical downwards force on the contact portion (90) into a force acting on the camera mount (40) in a direction away from the at least one elevator car door (38).

* * * * *